US011359864B2

(12) United States Patent
Becene et al.

(10) Patent No.: US 11,359,864 B2
(45) Date of Patent: Jun. 14, 2022

(54) RECTANGULAR HELICAL CORE GEOMETRY FOR HEAT EXCHANGER

(71) Applicant: Hamilton Sundstrand Corporation, Charlotte, NC (US)

(72) Inventors: Ahmet T. Becene, West Simsbury, CT (US); Gabriel Ruiz, Granby, CT (US); Feng Feng, South Windsor, CT (US); Michael Maynard, Springfield, MA (US); Michael Doe, Southwick, MA (US); Michele Hu, Manchester, CT (US); Ephraim Joseph, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 56 days.

(21) Appl. No.: 16/711,113

(22) Filed: Dec. 11, 2019

(65) Prior Publication Data
US 2020/0284518 A1    Sep. 10, 2020

Related U.S. Application Data

(60) Provisional application No. 62/815,843, filed on Mar. 8, 2019.

(51) Int. Cl.
*F28D 1/047* (2006.01)
*F28D 1/02* (2006.01)

(52) U.S. Cl.
CPC .... *F28D 1/0472* (2013.01); *F28D 2001/0273* (2013.01)

(58) Field of Classification Search
CPC ..... F28F 2210/02; F28D 1/0472; F28D 7/024
See application file for complete search history.

(56) References Cited

U.S. PATENT DOCUMENTS 266,160 A * 10/1882 Johnson ................ F28D 1/0477
                                                                62/527
185,315 A    11/1892 Yaryan
(Continued)

FOREIGN PATENT DOCUMENTS

DE    202019102083 U1    4/2019
EP       0074570 A2    3/1983
(Continued)

OTHER PUBLICATIONS

Extended European Search Report for EP Application No. 19216295.6, dated Jul. 22, 2020, 7 pages.
(Continued)

*Primary Examiner* — Devon Russell
(74) *Attorney, Agent, or Firm* — Kinney & Lange, P.A.

(57) ABSTRACT

A heat exchanger includes a first fluid manifold extending along a first fluid axis from a first fluid inlet to a first fluid outlet. The first fluid manifold comprises a inlet header, a outlet header, and a multi-helical core section. The inlet header is disposed to fork the first fluid inlet into a plurality of first fluid branches distributed laterally across a plane normal to the first fluid axis. The outlet header is disposed to combine the plurality of first fluid branches into the first fluid outlet. The multi-helical core section fluidly connects the inlet header to the outlet header via a plurality of laterally distributed helical tubes, each helical tube corresponding to one of the plurality of first fluid branches and oriented parallel to all others of the plurality of helical tubes at each axial location along the first fluid axis.

17 Claims, 2 Drawing Sheets

(56) References Cited

U.S. PATENT DOCUMENTS

| | | | |
|---|---|---|---|
| 1,768,222 A | 6/1930 | Uhde | |
| 1,913,573 A * | 6/1933 | Turner | F28D 1/0472 |
| | | | 165/81 |
| 2,734,224 A | 2/1956 | Wnstead | |
| 3,212,570 A | 10/1965 | Holman | |
| 3,240,675 A * | 3/1966 | Weber | F22B 1/08 |
| | | | 376/210 |
| 4,058,161 A | 11/1977 | Trepaud | |
| 4,451,960 A | 6/1984 | Molitor | |
| 4,570,703 A | 2/1986 | Ringsmuth et al. | |
| 5,388,635 A | 2/1995 | Gruber et al. | |
| 6,296,020 B1 | 10/2001 | McNeely et al. | |
| 6,688,381 B2 | 2/2004 | Pence et al. | |
| 7,240,723 B2 | 7/2007 | Wu et al. | |
| 8,241,239 B2 | 8/2012 | Solomon et al. | |
| 8,528,628 B2 | 9/2013 | Robinson | |
| 9,134,072 B2 | 9/2015 | Roisin et al. | |
| 9,541,331 B2 * | 1/2017 | Nagurny | F28D 7/024 |
| 9,656,212 B2 | 5/2017 | DiBiasio et al. | |
| 9,964,077 B2 * | 5/2018 | Neal | F28D 7/1607 |
| 9,976,815 B1 | 5/2018 | Roper et al. | |
| 10,048,019 B2 | 8/2018 | Karlen et al. | |
| 10,088,250 B2 | 10/2018 | Turney | |
| 10,267,515 B2 | 4/2019 | Adriany et al. | |
| 10,684,080 B2 | 6/2020 | Moore et al. | |
| 11,168,942 B2 | 11/2021 | Becene et al. | |
| 2003/0039169 A1 | 2/2003 | Ehrfeld et al. | |
| 2004/0195708 A1 | 10/2004 | Lavemann et al. | |
| 2008/0190586 A1 | 8/2008 | Robinson | |
| 2009/0269837 A1 | 10/2009 | Shevkoplyas et al. | |
| 2009/0274549 A1 | 11/2009 | Mitchell et al. | |
| 2009/0316972 A1 | 12/2009 | Borenstein et al. | |
| 2010/0297535 A1 | 11/2010 | Das et al. | |
| 2012/0125560 A1 | 5/2012 | McKeown et al. | |
| 2013/0206374 A1 | 8/2013 | Roisin et al. | |
| 2014/0262136 A1 | 9/2014 | Jensen | |
| 2015/0140190 A1 * | 5/2015 | Cully | A23L 13/60 |
| | | | 426/512 |
| 2016/0116218 A1 | 4/2016 | Shedd et al. | |
| 2017/0089643 A1 | 3/2017 | Arafat | |
| 2017/0191762 A1 | 7/2017 | Duelser et al. | |
| 2017/0205149 A1 | 7/2017 | Herring et al. | |
| 2017/0248372 A1 | 8/2017 | Emo et al. | |
| 2017/0328644 A1 | 11/2017 | Takahashi | |
| 2018/0038654 A1 | 2/2018 | Popp et al. | |
| 2018/0051934 A1 | 2/2018 | Wentland et al. | |
| 2018/0100703 A1 | 4/2018 | Beaver et al. | |
| 2018/0100704 A1 | 4/2018 | Lewandowski et al. | |
| 2018/0266770 A1 | 9/2018 | Wagner et al. | |
| 2018/0283794 A1 * | 10/2018 | Cerny | F28F 9/02 |
| 2018/0283795 A1 * | 10/2018 | Cerny | F28F 9/02 |
| 2019/0024989 A1 | 1/2019 | Wilson et al. | |
| 2019/0086154 A1 | 3/2019 | Adriany et al. | |
| 2019/0366290 A1 * | 12/2019 | Hofmann | B01J 19/0013 |
| 2020/0041212 A1 | 2/2020 | Palmer et al. | |

FOREIGN PATENT DOCUMENTS

| | | | |
|---|---|---|---|
| EP | 3124906 A1 | 2/2017 | |
| EP | 3410054 A1 | 12/2018 | |
| FR | 453494 A * | 6/1913 | F28D 1/0472 |
| GB | 588520 A | 5/1947 | |
| JP | 2006322643 A | 11/2006 | |
| WO | WO2010138061 A1 | 12/2010 | |
| WO | WO2017052798 A1 | 3/2017 | |
| WO | WO2018154063 A1 | 8/2018 | |
| WO | 2018191787 A1 | 10/2018 | |
| WO | WO2018182808 A1 | 10/2018 | |

OTHER PUBLICATIONS

Extended European Search Report for EP Application No. 19215931.7, dated Jul. 28, 2020, 8 pages.

Extended European Search Report for EP Application No. 19216146.1, dated Jul. 2, 2020, 8 pages.

Extended European Search Report for EP Application No. 19213258.7, dated May 8, 2020, 9 pages.

L. Luo, et al., "Constructal approach and multi-scale components" from Applied Thermal Engineering 27 (2007) pp. 1708-1714.

Communication Pursuant to Article 94(3) EPC for EP Application No. 19216221.2, dated Oct. 27, 2021, 6 pages.

Extended European Search Report for EP Application No. 21176197.8, dated Nov. 9, 2021, 8 pages.

L. Luo et al., "Integration of Constructal Distributors to a Mini Crossflow Heat Exchanger and Their Assembly Configuration Optimization", from Chemical Engineering Science 62, (2007) pp. 3605-3619.

L. Luo et al., Experimental Study of Constructal Distributor for Flow Equidistribution in a Mini Crossflow Heat Exchanger (MCHE), from Chemical Engineering and Processing 47, (2008) pp. 229-236.

Z. Fan, et al., "Numerical Investigation of Constructal Distributors with Different Configurations", from Chinese Journal of Chemical Engineering, 17(1), (2009) pp. 175-178.

* cited by examiner

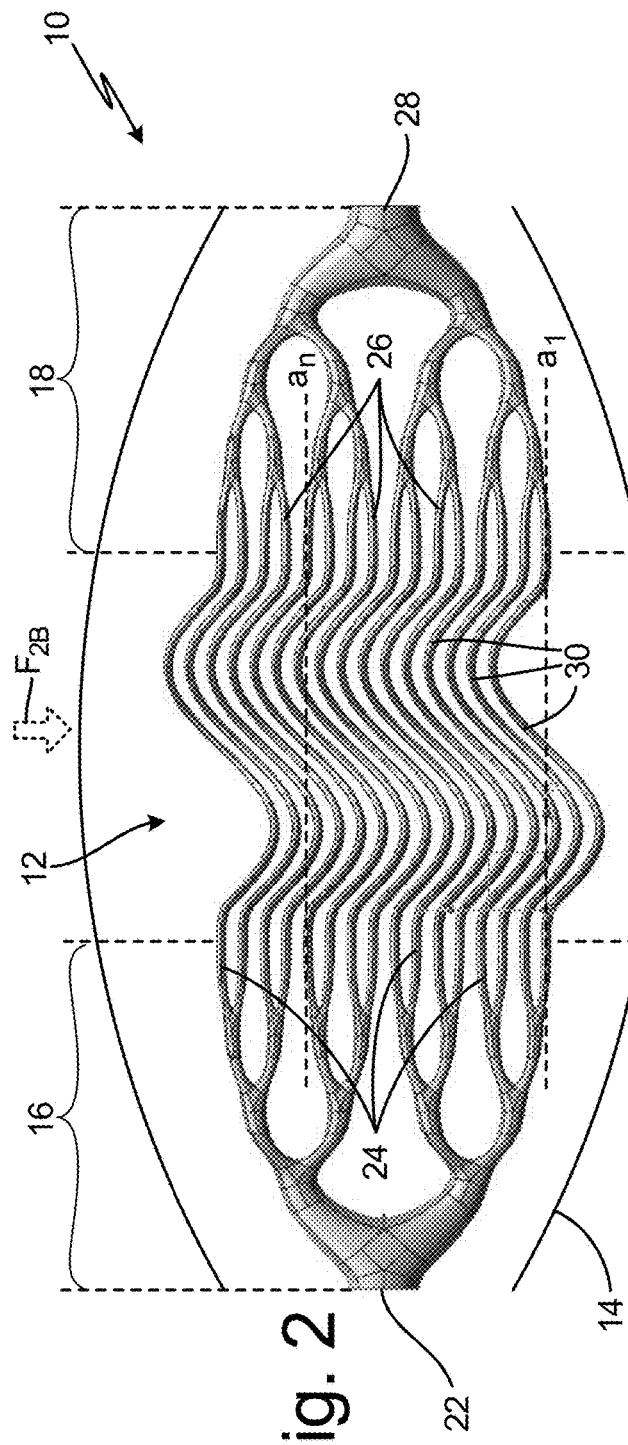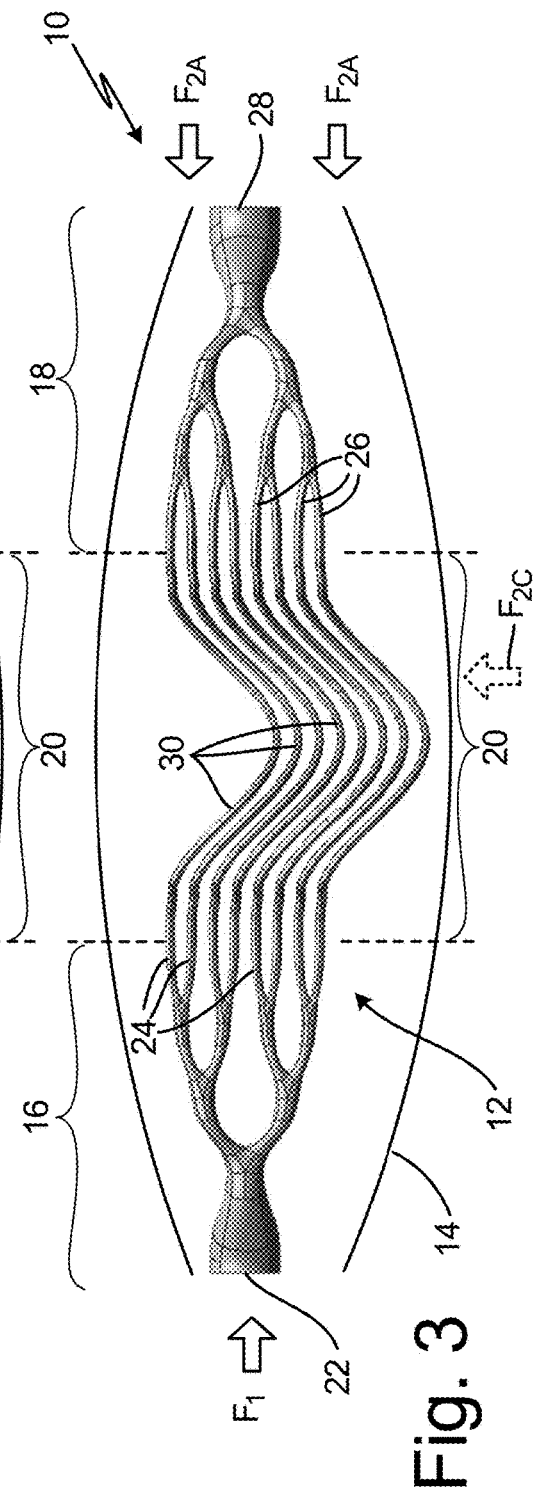

RECTANGULAR HELICAL CORE GEOMETRY FOR HEAT EXCHANGER

CROSS-REFERENCE TO RELATED APPLICATION(S)

This application claims the benefit of U.S. Provisional Application No. 62/815,843 filed Mar. 8, 2019 for "RECTANGULAR HELICAL CORE GEOMETRY FOR HEAT EXCHANGER" by A. Becene, G. Ruiz, F. Feng, M. Maynard, M. Doe, M. Hu, and E. Joseph.

BACKGROUND

The present disclosure is related generally to heat exchangers and more particularly to heat exchanger core designs.

Heat exchangers can provide a compact, low-weight, and highly effective means of exchanging heat from a hot fluid to a cold fluid. Heat exchangers that operate at elevated temperatures, such as those used in modern aircraft engines, often have short service lifetimes due to thermal stresses, which can cause expansion and cracking of the fluid conduits. Thermal stresses can be caused by mismatched temperature distribution, component stiffness, geometry discontinuity, and material properties (e.g., thermal expansion coefficients and modulus), with regions of highest thermal stress generally located at the interface of the heat exchanger inlet/outlet and core.

A need exists for heat exchangers with increased heat transfer, reduced pressure loss and vibration excitation, and improved performance under thermal stresses.

SUMMARY

In one aspect, the present disclosure is directed toward a heat exchanger that includes a first fluid manifold extending along a first fluid axis from a first fluid inlet to a first fluid outlet. The first fluid manifold comprises a inlet header, a outlet header, and a multi-helical core section. The inlet header is disposed to fork the first fluid inlet into a plurality of first fluid branches distributed laterally across a plane normal to the first fluid axis. The outlet header is disposed to combine the plurality of first fluid branches into the first fluid outlet. The multi-helical core section fluidly connects the inlet header to the outlet header via a plurality of laterally distributed helical tubes, each helical tube corresponding to one of the plurality of first fluid branches and oriented parallel to all others of the plurality of helical tubes at each axial location along the first fluid axis.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 2 is a schematized overhead view of the heat exchanger of FIG. 1.

FIG. 3 is a schematized side view of the heat exchanger of FIGS. 1 and 2.

Figure 1:
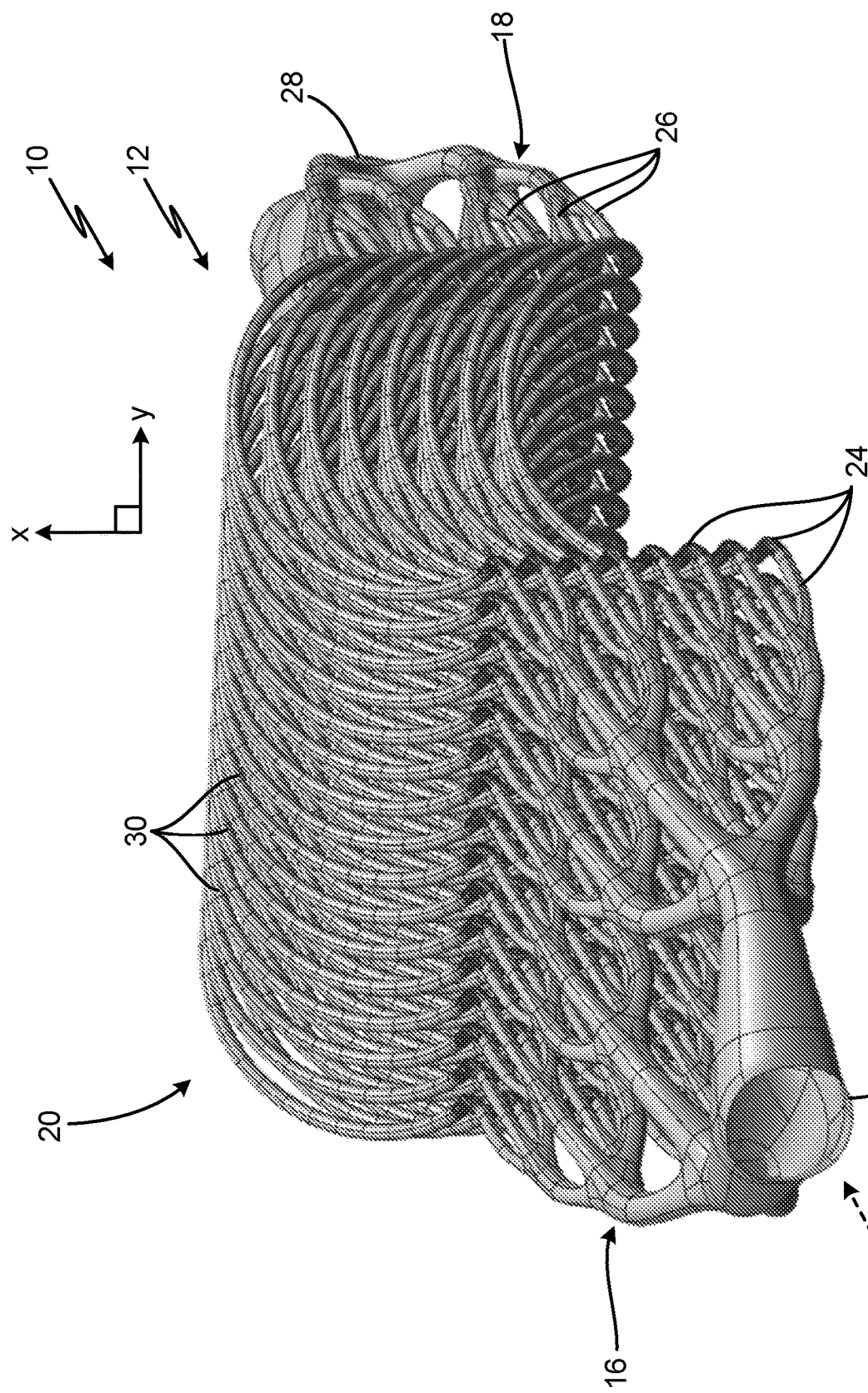
FIG. 1 is a perspective view of a heat exchanger with a rectangularly distributed helical core.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A heat exchanger with a multi-helical core is presented herein. This multi-helical core is made up of a plurality of structurally independent helical tubes distributed in parallel, laterally, across a rectangular assembly. The helical geometry of each individual tube increases overall heat exchanger functional length and surface area as a function of the total axial length of the core, and provides structural compliance that allows the core to serve as a spring to relieve thermal and other stresses from the heat exchanger and adjacent (connecting) flow elements.

FIG. 1 is a perspective view of heat exchanger 10. FIGS. 2 and 3 provide schematized overhead and side views, respectively, of heat exchanger 10. FIGS. 1-3 are described collectively hereinafter. Heat exchanger 10 includes first fluid manifold 12 and second fluid guide 14 (see FIGS. 2 and 3). First fluid manifold 12 includes inlet header 16, outlet header 18, and core section 20. Inlet header 16 branches from inlet passage 22 into a plurality of inlet header branches 24, and outlet header 18 recombines outlet header branches 26 into outlet passage 28. Core 20 is formed of a plurality of structurally independent helical tubes 30 that each extend from a separate inlet header branch 24 to a separate outlet header branch 26.

During operation of heat exchanger 10, hot fluid flow F1 is provided to inlet header 16, flows through core 20, and exits through outlet header 18. Thermal energy is transferred from hot fluid flow F1 to cooling fluid flow F2 as hot fluid flow F1 passes through core 20. It will be understood by one of ordinary skill in the art that the disclosed independent cold flow structure can be tailored for use with a wide variety of core geometries and is not limited to the embodiments shown. Furthermore, although the present disclosure refers to some flow as "cold" and other as "hot," the present geometry can more generally be applied to any two fluid flows in a heat exchange relationship, e.g. wherein F1 and F2 are exchanged i.e. as cold and hot flows, respectively.

As illustrated in FIG. 1, heat exchanger 10 extends axially along a fluid axis A, which connects extends from inlet passage 22 to outlet passage 28. In this embodiment, axis A is a straight line defining a primary flow direction of hot fluid flow F1 through first fluid manifold 12. In variations on the depicted embodiment, however, heat exchanger 10 can extend along a contoured (non-straight) axis, e.g. due to space constraints.

Headers 16, 18 distribute and receive fluid, respectively, substantially evenly across core 20. Specifically, inlet header 16 splits into inlet header branches 24, and outlet header 18 recombines from outlet header branches 26. In the illustrated embodiment, header 16 is a successively fractally branching manifold with multiple stages of branches, each narrowing in cross-sectional flow area with respect to the previous stage of less numerous branches, finally terminating in the full count of outlet header branches 24 as the narrowest and most axially distant from inlet passage 22. More specifically, the present figures illustrate each stage of header 16 branching linearly or rectangularly, and distributing in a row-byrow pattern across a common plane transverse to axis A. More generally, however, header 16 can be of any shape capable of distributing fluid from a single source at inlet passage 22 across the multitude of separate helical tubes 30 of core 20. The illustrated embodiment, however, advantageously reduces pressure drop and provides additional mechanical compliance along axis A, within header 16.

As depicted in FIG. 1, header 18 substantially mirrors header 16, across core 20. In at least some embodiments, headers 16, 18 and core 20 are all formed monolithically. More generally, all components of heat exchanger first fluid manifold 12 can be formed partially or entirely by additive manufacturing. For metal components (e.g., Inconel, aluminum, titanium, etc.) exemplary additive manufacturing processes include but are not limited to powder bed fusion techniques such as direct metal laser sintering (DMLS), laser net shape manufacturing (LNSM), electron beam manufacturing (EBM). For polymer or plastic components, stereolithography (SLA) can be used. Additive manufacturing is particularly useful in obtaining unique geometries (e.g., varied core tube radii, arcuate core tubes, branched inlet and outlet headers) and for reducing the need for welds or other attachments (e.g., between headers 16, 18 and core 20). However, other suitable manufacturing process can be used. For example, header and core elements can in some embodiments be fabricated separately and joined via later manufacturing steps.

The majority of heat transfer enabled by heat exchanger 10 is accomplished within core section 20. Core section 20 is formed of a plurality of separate, structurally independent helical tubes 30. As best seen through the combination of FIGS. 1-3, each helical tube 30 has a helical or spring-like geometry, extending axially and turning circumferentially about separate axes $a_1$-$a_n$ (see FIG. 2). These axes $a_1$-$a_n$ are, in the illustrated embodiment, all parallel to fluid axis A, and are cross-sectionally distributed across a plane orthogonal to fluid axis A in a rectangular array. More generally, axes $a_1$-$a_n$ are distributed in rows and/or columns resulting in substantially uniform spacing between adjacent axes. The depicted rectangular architecture provides one example of such an arrangement, but axes $a_1$-$a_n$ can also, for example, be arranged in a diamond or oblique grid. The helical curvature of each helical tube 30 as a function of axial position parallels other tubes, such that spacing between tubes remains as consistent as possible across the entire axial extent of core 20. This architecture guarantees a consistent gap spacing between all adjacent tubes 30, so as to promote even airflow F2 therebetween. All helical tubes 30 can have a substantially identical and uniform inner diameter with a circular cross-section, resulting in equal cross-sectional areas. In the illustrated embodiment, the spacing between adjacent helical tubes 30 is less than this inner diameter.

The present disclosure for the most part presumes that core 20 consists of a plurality of identical, evenly distributed helical tubes 30. The rectangular distribution of helical tubes 30 facilitates this uniformity, relative to rotationally symmetric or irregular configurations. The aforementioned rectangular distribution of helical tubes 30 in core 20 also allows planes of axes $a_1$-$a_n$ to be oriented with respect to fluid flow F2 (e.g. obliquely or orthogonally), to optimize heat transfer. In some embodiments, however, characteristics of individual helical tubes 30 can vary independently, e.g. helix angle, tube diameter, and/or tube thickness. Because helical tubes 30 are structurally independent and are not nested with one another, characteristics and dimensions of helical tubes 30 can be independently adjusted, e.g. to handle packing constraints or irregularities in fluid flow F2.

Second fluid guide 14 is illustrated schematically in FIGS. 2 and 3. Second fluid guide 14 can be included in some embodiments to constrain cooling fluid flow F2. Second fluid guide 14 is illustrated as a baffle surrounding mechanically unconnected to first fluid manifold 12. In other embodiments, second fluid guide 14 can have additional sub-layers or separations to further channel cooling fluid flow F2 through and across first fluid manifold 12. In still other embodiments, by contrast, second fluid guide 14 can be omitted altogether, and first fluid manifold 12 directly exposed to an unconstrained environment of cooling fluid flow F2. Second fluid guide 14 need not closely match the geometry of first fluid manifold 12, but can in some embodiments parallel at least some aspects of the geometry of first fluid manifold, e.g. to more closely capture core section 20 as a whole. In the illustrated embodiment, second fluid guide 14 channels cooling fluid flow F2 in a direction substantially antiparallel (i.e. parallel to but opposite) hot fluid flow F1. In other embodiments, second fluid guide 14 can instead direct cooling fluid flow F2 in a direction transverse to F1, e.g. in a cross-flow direction.

The helical shape of tubes 30 of core 20 serves several functions. First, helical tubes 30 have no sharp corners or interfaces (e.g. with headers 16, 18), and consequently reduce unnecessary pressure losses. Second, helical tubes 30 are compliant along axis A, acting as a spring capable of deforming to accommodation expansion or axial translation of adjacent components. In particular, helical tubes 30 can be capable of compliantly deforming so as to accommodate thermal growth of headers 16, 18, and/or translation of headers 16, 18 due to thermal growth of adjacent (upstream or downstream) components. This mechanical compliance provided by core 20 allows heat exchanger to better distribute and weather thermal and other mechanical stresses. In at least some embodiments, helical core 20 is significantly less compliant laterally, i.e. in dimensions transverse to fluid axis A. This increased lateral stiffness provides first fluid manifold 12 with resonant frequencies of oscillation transverse to the first fluid flow that are greater than the range of operating frequencies of a surrounding engine or other components for at least its three highest amplitude natural frequencies, for example, so as to avoid excitation within the expected environment of heat exchanger 10. The generally circular cross-section of each tube 30 contributes to this increased lateral stiffness. The helical geometry of tubes 30 also provides greater fluid flow length within each tube 30, and correspondingly greater surface area exposed to cooling fluid flow F2. The overall passage length of each tube 30 can, for example, be double the axial length of core 30, or more. Helical tubes 30 can introduce additional turbulence to fluid flows F1, F2, for additional heat transfer.

In view of the above, in comparison to conventional straight-line connected channels, core 20 provides heat exchanger 10 with improved axial compliance to handle thermal stresses, increased lateral stiffness to avoid potentially harmful resonance conditions, and increased surface area exposed to cooling fluid flow F2 for greater heat exchange, all with only modest pressure losses from inlet passage 22 to outlet passage 28.

Discussion of Possible Embodiments

The following are non-exclusive descriptions of possible embodiments of the present invention.

A heat exchanger comprising: a fluid manifold extending along a first fluid axis from a first fluid inlet to a first fluid outlet, the first fluid manifold comprising: a inlet header disposed to fork the first fluid inlet into a plurality of first fluid branches distributed laterally across a plane orthogonal to the first fluid axis; a outlet header disposed to combine the plurality of first fluid branches into the first fluid outlet; and a multi-helical core section fluidly connecting the inlet header to the outlet header via a plurality of laterally distributed helical tubes, each helical tube corresponding to one of the plurality of first fluid branches and oriented parallel to all others of the plurality of helical tubes at each axial location along the first fluid axis.

The heat exchanger of the preceding paragraph can optionally include, additionally and/or alternatively, any one or more of the following features, configurations and/or additional components:

A further embodiment of the foregoing heat exchanger, wherein each of the plurality of helical tubes is structurally independent from all others of the plurality of helical tubes, such that the plurality of helical tubes are mechanically connected to each other only at the inlet header and the outlet header.

A further embodiment of the foregoing heat exchanger, wherein all of the plurality of helical tubes meet with inlet header at a common inlet angle, and meet with the outlet header at a common outlet angle.

A further embodiment of the foregoing heat exchanger, wherein the inlet header distributes the first fluid branches in laterally separated rows.

A further embodiment of the foregoing heat exchanger, wherein the inlet header distributes the first fluid branches in laterally separated columns, such that the laterally separated rows and columns define a grid.

A further embodiment of the foregoing heat exchanger, wherein each of the plurality of helical tubes is mechanically separated from adjacent of the plurality of helical tubes by a lateral gap.

A further embodiment of the foregoing heat exchanger, wherein a structural rigidity of the first fluid manifold along the first fluid axis is less than along the plane normal to the first fluid axis.

A further embodiment of the foregoing heat exchanger, wherein the first fluid manifold is situated in an environment with a known range of operating frequencies, and wherein the first fluid manifold has at least a highest amplitude natural resonance frequency of oscillation transverse to the first fluid axis that is greater than the known range of operating frequencies.

A further embodiment of the foregoing heat exchanger, wherein each of plurality of helical tubes has a total passage length at least double its extent along the first fluid axis.

A further embodiment of the foregoing heat exchanger, wherein the multi-helical core forms a rectangular block shape extending between the inlet header and the outlet header, wherein the rectangular block shape is principally compliant along the first fluid axis.

A further embodiment of the foregoing heat exchanger, wherein the multi-helical core is capable of compliantly deforming to accommodate axial growth of the inlet header and outlet header.

A further embodiment of the foregoing heat exchanger, further comprising a second fluid flow structure disposed to direct a second fluid to impinge on the first fluid manifold, wherein the second fluid flow structure comprises a baffle surrounding a least the multi-helical core section of the first fluid manifold.

A further embodiment of the foregoing heat exchanger, wherein the helical tubes of the core section are evenly distributed across the plane normal to the first fluid axis.

A further embodiment of the foregoing heat exchanger, wherein the entirety of the first fluid manifold is formed monolithically as a single structure.

A further embodiment of the foregoing heat exchanger, wherein all of the plurality of helical tubes have identical flow area.

A further embodiment of the foregoing heat exchanger, wherein all of the plurality of helical tubes have a circular cross-section with a common internal flow diameter.

A further embodiment of the foregoing heat exchanger, wherein each of the plurality of helical tubes is separated from adjacent of the plurality of helical tubes by at least the common internal flow diameter.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A heat exchanger comprising:
a fluid manifold extending along a first fluid axis from a first fluid inlet to a first fluid outlet, the first fluid manifold comprising:
a fractally branching inlet header disposed to fork the first fluid inlet into a plurality of intermediate branches extending along the first fluid axis, and to further fork each of the plurality of intermediate branches into a plurality of first fluid branches distributed laterally across a plane orthogonal to the first fluid axis and extending along the first fluid axis;
a fractally recombining outlet header with multiple stages of recombination disposed to combine the plurality of first fluid branches into the first fluid outlet; and
a multi-helical core section fluidly connecting the inlet header to the outlet header via a plurality of laterally distributed helical tubes, wherein:
each helical tube corresponds to one of the plurality of first fluid branches;
each helical tube is oriented parallel along its entire extent to all others of the plurality of helical tubes
each of the laterally distributed helical tubes extends along a helical axis;

the laterally distributed helical tubes have helical shapes defined by a helical diameter about each respective helical axis; and the helical axis of each helical tube is spaced from the helical axis of an adjacent helical tube by less than the helical diameter.

2. The heat exchanger of claim 1, wherein each of the plurality of helical tubes is structurally independent from all others of the plurality of helical tubes, such that the plurality of helical tubes are mechanically connected to each other only at the inlet header and the outlet header.

3. The heat exchanger of claim 1, wherein all of the plurality of helical tubes meet with inlet header at a common inlet angle, and meet with the outlet header at a common outlet angle.

4. The heat exchanger of claim 1, wherein the inlet header distributes the first fluid branches in laterally separated rows.

5. The heat exchanger of claim 4, wherein the inlet header distributes the first fluid branches in laterally separated columns, such that the laterally separated rows and columns define a grid.

6. The heat exchanger of claim 1, wherein each of the plurality of helical tubes is mechanically separated from adjacent of the plurality of helical tubes by a lateral gap.

7. The heat exchanger of claim 1, wherein a structural rigidity of the first fluid manifold along the first fluid axis is less than along the plane normal to the first fluid axis.

8. The heat exchanger of claim 7, wherein the first fluid manifold is situated in an environment with a known range of operating frequencies, and wherein the first fluid manifold has at least a highest amplitude natural resonance frequency of oscillation transverse to the first fluid axis that is greater than the known range of operating frequencies.

9. The heat exchanger of claim 1, wherein each of plurality of helical tubes has a total passage length at least double its extent along the first fluid axis.

10. The heat exchanger of claim 1, wherein the multi-helical core forms a rectangular block shape extending between the inlet header and the outlet header, wherein the rectangular block shape is principally compliant along the first fluid axis.

11. The heat exchanger of claim 1, wherein the multi-helical core is capable of compliantly deforming to accommodate axial growth of the inlet header and outlet header.

12. The heat exchanger of claim 1, further comprising a second fluid flow structure disposed to direct a second fluid to impinge on the first fluid manifold, wherein the second fluid flow structure comprises a baffle surrounding a least the multi-helical core section of the first fluid manifold.

13. The heat exchanger of claim 1, wherein the helical tubes of the core section are evenly distributed across the plane normal to the first fluid axis.

14. The heat exchanger of claim 1, wherein the entirety of the first fluid manifold is formed monolithically as a single structure.

15. The heat exchanger of claim 1, wherein all of the plurality of helical tubes have identical flow area.

16. The heat exchanger of claim 15, wherein all of the plurality of helical tubes have a circular cross-section with a common internal flow diameter.

17. The heat exchanger of claim 16, wherein each of the plurality of helical tubes is separated from adjacent of the plurality of helical tubes by at least the common internal flow diameter.

* * * * *